Nov. 21, 1972  R. M. BERGER ET AL  3,703,429
APPARATUS FOR MAKING FILTER MEANS
Original Filed June 10, 1970  6 Sheets-Sheet 1

INVENTORS
RICHARD M. BERGER
ELWIN W. BROOKS

Holman & Stern
ATTORNEY

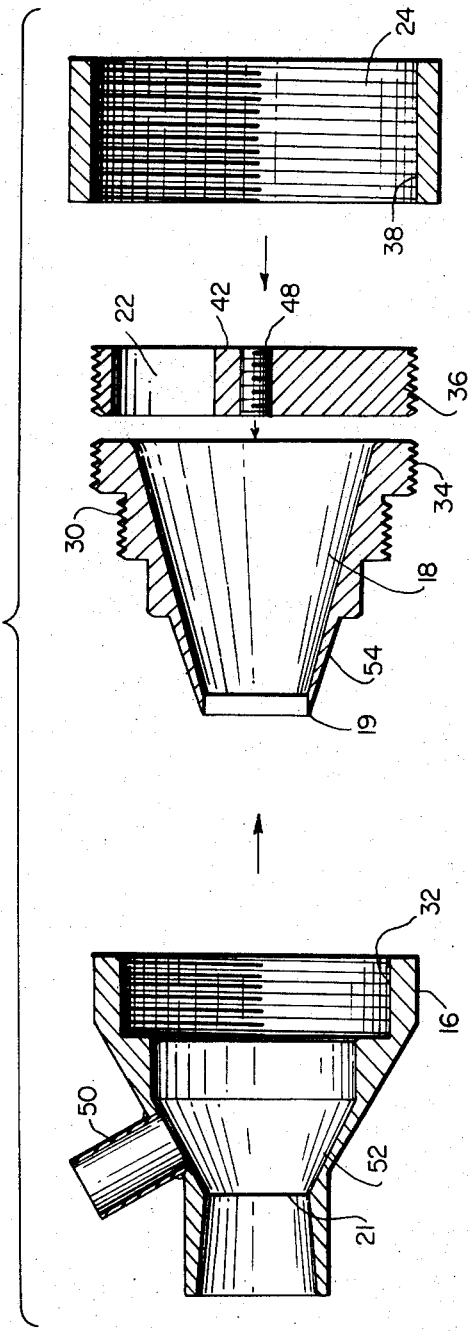
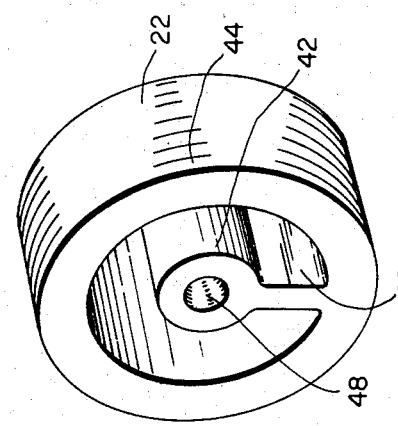
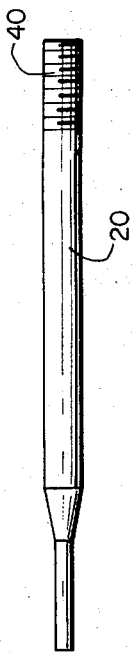
FIG. 2
FIG. 4
FIG. 3
INVENTORS
RICHARD M. BERGER
ELWIN W. BROOKS
ATTORNEY

INVENTORS
RICHARD M. BERGER
ELWIN W. BROOKS

ATTORNEY

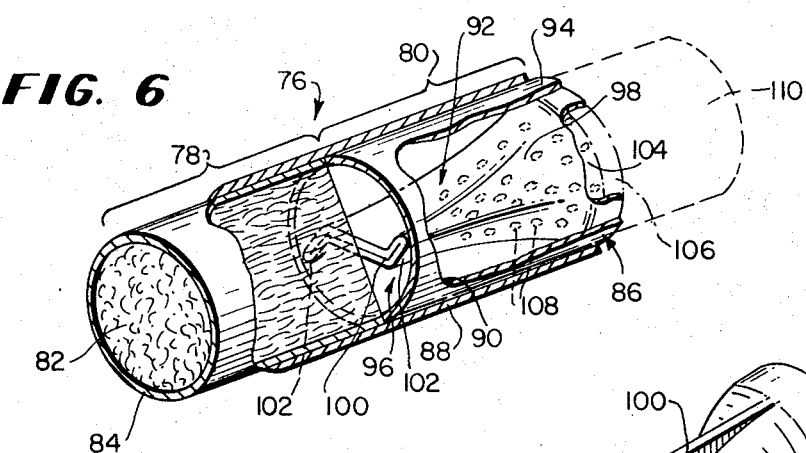
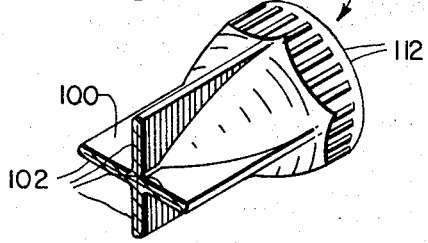
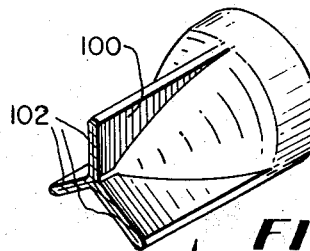
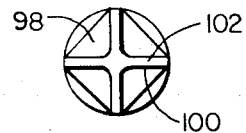
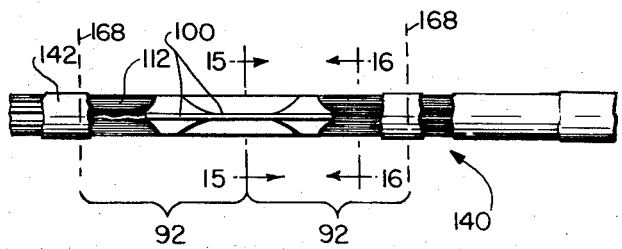
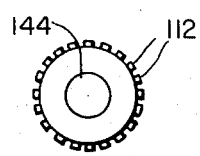

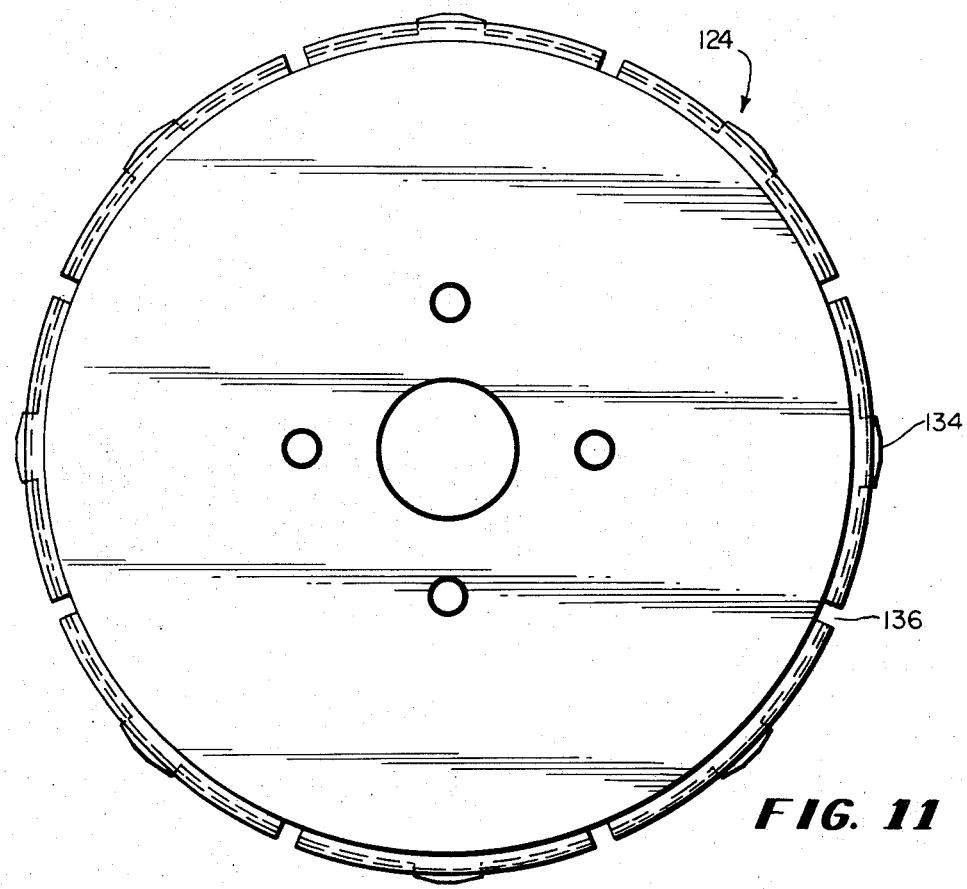
FIG. 11
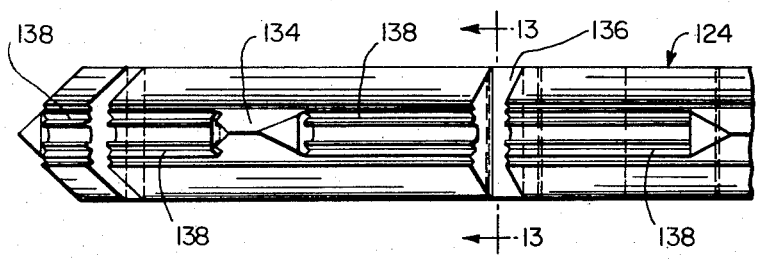
FIG. 12
FIG. 13
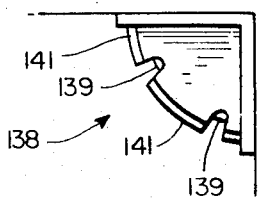
INVENTORS
RICHARD M. BERGER
ELWIN W. BROOKS
ATTORNEY Nov. 21, 1972    R. M. BERGER ET AL    3,703,429
APPARATUS FOR MAKING FILTER MEANS
Original Filed June 10, 1970    6 Sheets-Sheet 6

INVENTORS
RICHARD M. BERGER
ELWIN W. BROOKS

*Holman & Stern*

ATTORNEY 3,703,429
APPARATUS FOR MAKING FILTER MEANS
Richard M. Berger, Richmond, and Elwin W. Brooks, Mechanicsville, Va., assignors to American Filtrona Corporation, Richmond, Va.
Division of application Ser. No. 45,109, June 10, 1970, now Patent No. 3,637,447, which is a continuation-in-part of applications Ser. No. 727,477, May 8, 1968, now Patent No. 3,533,416, and Ser. No. 820,355, Apr. 30, 1969, now Patent No. 3,599,646. Said Ser. No. 820,355 being a continuation-in-part of said application Ser. No. 727,477. This application June 23, 1971, Ser. No. 155,705
Int. Cl. D04h 1/44; B65h 5/22
U.S. Cl. 156—441
12 Claims

ABSTRACT OF THE DISCLOSURE

A method and apparatus for making filter means of a type which is constructed to provide elongated, high surface area, cavities defined on opposite sides of a relatively thin wall formed of filtering material with only the ends of the filter means contacting an overwrapped outer tube thereby presenting maximum available surface area of the material from which the products are formed to the smoke for filtration is disclosed. A tow of a suitable filtering material is passed through an air nozzle containing a mandrel centered therein, the tow thereby achieving a uniformly random, but tubular, configuration and then through a steam curing station followed by an air curing station. The formed rod is then again steam cured and passes to a crimping device which imparts a particular configuration thereto. The crimped rod is then again air cured, wrapped, and cut. In another embodiment, an addition material may be added by means either of a printing applicator device or a pulsating nozzle device.

---

This application is a divisional application of copending application Ser. No. 45,109 filed June 10, 1970 now Pat. No. 3,637,447 which is a continuation-in-part of co-pending application Ser. No. 727,477, filed May 8, 1968 now Pat. No. 3,533,416, and of co-pending application Ser. No. 820,355, filed Apr. 30, 1969 now U.S. Pat. No. 3,599,646, which in turn is a continuation-in-part of the aforementioned application Ser. No. 727,477.

This invention relates to the production of filter means and particularly to the production of tobacco smoke filter elements. More specifically, this invention relates to methods and apparatus for the production of such filter means.

Various prior art techniques are known for making filters for use in connection with cigarettes, and the like, although the resulting products, in general, have one or more disadvantages. Perhaps the most important property of a filter means is its efficiency, that is, its ability to remove undesirable constituents from tobacco smoke. Filtration efficiency is ordinarily measured in terms of the percentage of total particulate matter (TPM) removed from the smoke, although there is also some concern for the percentage of gas phase constituents which a filter means is capable of removing. While filtration efficiency is perhaps the most important property of a cigarette filter means, it has been necessary, with prior art filter devices, to compromise the filtration efficiency in order to provide this filter with other properties, such as pressure drop, taste, hardness, appearance and cost, which are important from the standpoint of acceptability. For example, the most commonly utilized cellulose acetate filter means has a relatively low filtration efficiency since increased efficiency can only be obtained either by increasing the density of the filter material or the length of the filter element, both of which produce a pressure drop across the filter which is excessive and unacceptable from a commercial standpoint. While various suggestions have been made for the production of filter means which have improved filtering properties, such prior art developments have not become commercial either because the resultant filter means have been found to have objectionable "taste" characteristics whereby cigarettes provided with such filtering means fail to satisfy a large segment of the smoking public or because the techniques and/or the materials utilized in the production of such filter means have increased the cost excessively.

In any event, it is well known in the industry that there is no filter means presently on the market which provides relatively high filtration efficiency, on the order of 60-95 percent (TPM), without suffering from undesirably high manufacturing costs, poor taste, high pressure drop or other such commercially unacceptable characteristics. The need and desirability of providing; such a filter means is believed to be readily apparent, and the invention described and claimed in the aforementioned co-pending application Ser. No. 727,477, is directed to this need. That invention provides a filter means for use with a cigarette, or the like, having exceptionally high filtration efficiency, in many embodiments removing as much as 95 percent of the total particulate matter, while having an acceptable pressure drop, as well as satisfactory "taste," hardness and appearance. Further, there is described in the aforesaid co-pending application Ser. No. 727,477 various techniques for the production of a filter means of the type described utilizing inexpensive materials in relatively small quantities, as well as simple and efficient procedures whereby such filter means can be manufactured on a mass production basis at a cost which is acceptable to the industry. Accordingly, the present invention provides processing equipment and techniques which permit high speed, continuous production of integral products of this nature without the use for handling special baffles or other extraneous elements which tend to slow down production rates and increase rejects due to the difficulty in manipulating such small articles in a commercial operation.

A particular means for forming filter elements of the type described is described on pages 13 through 15 of the aforementioned co-pending application Ser. No. 727,477 and such disclosure is embodied herein in its entirety by reference. The aforesaid means, described in relatively general terms in the aforementioned co-pending application, is the basic means utilized for manufacturing the novel filter of that invention. The present invention, however, is concerned with a more efficient improved apparatus for achieving the result, namely, the production of that novel filter.

Accordingly, it is a primary object of the present invention to provide an apparatus for making filters of the type described which operates at high speed.

It is another primary object of the present invention to provide an apparatus for the high speed, continuous production of filters of the type described without the need for handling special baffles, or other extraneous elements.

It is a further object of the present invention to provide an apparatus for making filters of the type described using a large variety of filtering materials.

Consistent with the foregoing objects, it is yet another object of the present invention to provide an apparatus for the manufacture of filter means which are self-sustaining and self-centering, with an integral construction, and with a maximum available surface area being presented for filtration of smoke passing therethrough.

It is still another object of the present invention to provide an improved filter having high filtration efficiency while having an acceptable pressure drop.

It is yet another object of the present invention to provide an improved filter manufactured by the method and apparatus described.

Other objects of the present invention will either be set forth specifically hereinafter or will be obvious from the following detailed description. Such description makes reference to the annexed drawings, wherein:

FIG. 2 is an exploded vertical cross sectional view of means for forming a band of filtering material into an axially elongated, hollow, filtering element;

FIG. 3 is a side view of a mandrel used in conjunction with the means of FIG. 2;

FIG. 4 is a perspective view of the mandrel support utilized in conjunction with the mandrel of FIG. 3 and the means of FIG. 2;

FIG. 6 is an enlarged fragmentary perspective view of a portion of a filtered cigarette incorporating a filter element manufactured according to the instant inventive concepts, parts being broken away and in section for illustrative clarity, and modifications of this embodiment of a filter means according hereto being shown in dotted lines;

FIGS. 7, 8 and 9 are enlarged fragmentary perspective views of other embodiments of the filter of FIG. 6;

FIG. 11 is a vertical elevational view of a crimping wheel used in the apparatus of the present invention;

FIG. 12 is a partial edge view of the crimping wheel of FIG. 11;

FIG. 13 is a vertical sectional view, taken on line 13—13 of FIG. 12;

FIG. 14 is a side view, partially broken away, of a filter rod made in the apparatus of the present invention;

FIG. 15 is a transverse cross sectional view, taken along line 15—15 of FIG. 14;

FIG. 16 is a transverse cross sectional view, taken along line 16—16 of FIG. 14;

Like reference characters refer to like parts throughout the several views of the drawings.

Figure 1:
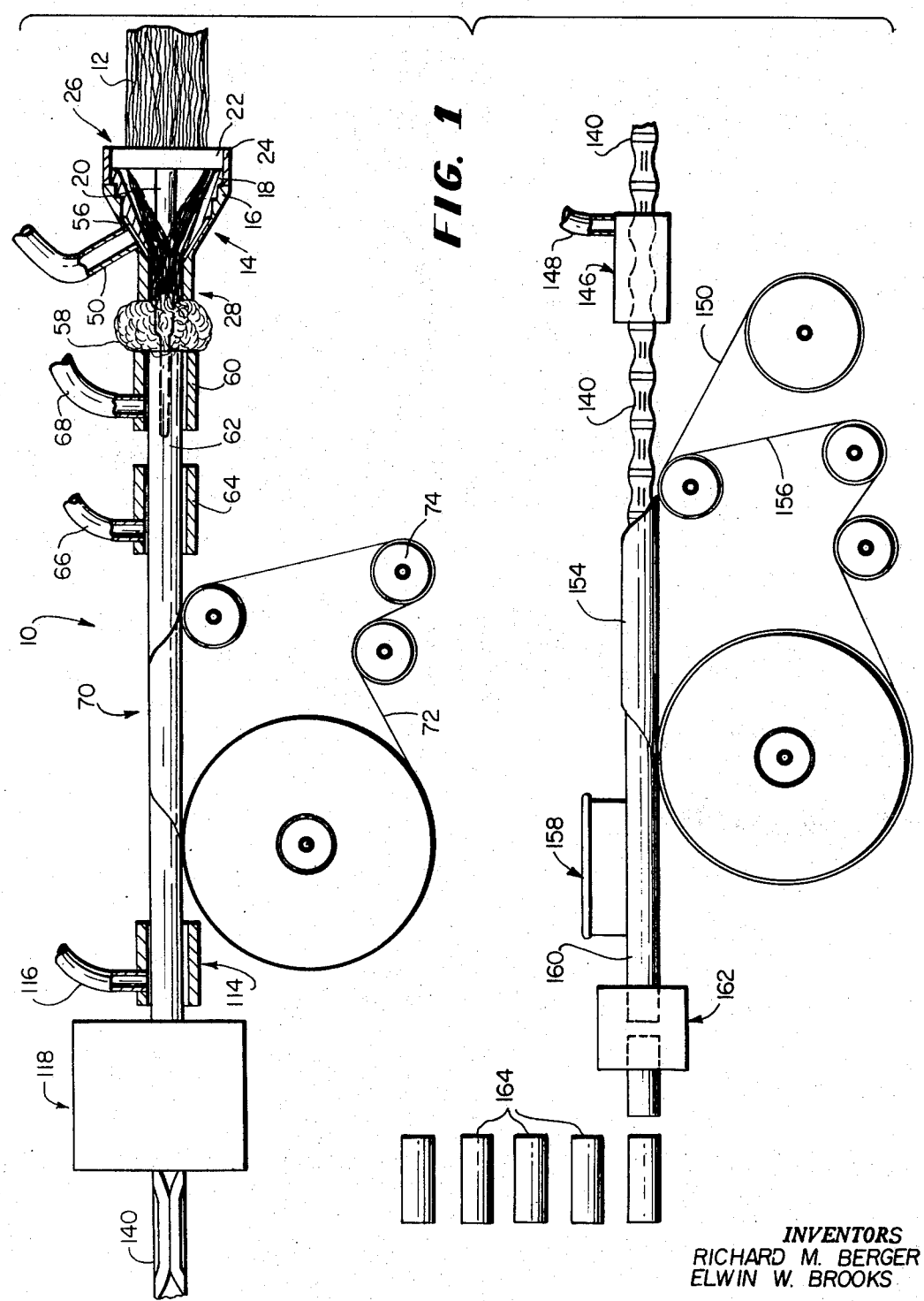
FIG. 1 is a schematic view of one embedoment of a method and means for making filter elements of the type described.

Referring now to the drawings, and more particularly to FIG. 1, a method and means for forming filter elements of the type described is schematically designated by the reference numeral 10. It should be noted at the outset that the various stations of the apparatus are arranged in a single plane, but for ease of illustration, the schematic presentation is shown in two segments. Filtering material in sheet form is designated at 12. This filtering material in band form is coming from a bale and band forming apparatus conventional in the trade which are not shown. The filtering material 12 can comprise any suitable substance, such as, for example, cellulose acetate fibers in the form of a continuous filamentary tow. For certain uses and to achieve certain filtering and/or adsorbing and/or liquid-holding properties, the cellulose acetate fibers may be mixed with other materials, such as, cellulose, viscose, cotton, cellulose acetate-butyrate, cellulose propionate, activated carbon, asbestos, glass fibers, metal fibers, wood fibers, and the like. The material is preferably opened, crimped, continuous filamentary cellulose acetate tow having about 9 percent glycerin triacetate as a plasticizer in fine droplets distributed upon its surface. Any suitable plasticizer may be used, such materials being well known in the art.

The term "continuous filamentary tow," as used in this specification and the appended claims, is intended to define a material such as that which results when filaments extruded from a plurality of spinnerets are brought together and combined to form a continuous body of fibers randomly oriented primarily in a longitudinal direction. In such a tow, the filaments are generally longitudinally aligned in substantially parallel orientation, but include crimped portions which may form short sections running more or less at random in non-parallel diverging and converging directions.

Continuous filamentary tows of plasticized cellulose acetate fibers as well as various other plastic materials, such as polyethylene, polypropylene, nylon and the like, have been used heretofore in the manufacture of smoke filters for cigarettes, cigars, and the like. Although the process of this invention is applicable to the various filamentary materials of this type, since plasticized cellulose acetate is the most common plastic used in the manufacture of cigarette filters, the specification hereof will be generally set forth in terms of this material. However, it is to be understood that the instant inventive concepts are not to be limited to this preferred embodiment.

Generally, the fibers of a cellulose acetate tow merging from the spinneret are bunched together to form a "raw tow" which is collected into a bale for subsequent processing. Such processing usually involves, in addition to unwinding of the "raw tow," spreading apart of the fibers to provide a relatively thin layer of the same, tensioning of the fibers to render the crimp of uniform character, and impregnating the fibrous layer with plasticizer to bind adjacent fibers together.

The tow of filtering material 12 in band form is fed into a stuffer jet, or air nozzle, 14. The construction of the air nozzle 14 is shown in FIGS. 2 through 5. The air nozzle 14 comprises an outer member 16, an inner member 18, a mandrel 20, a mandrel support 22, and a retaining ring 24. The air nozzle 14 is generally shaped as a truncated cone, thereby having a greater cross-section at the entrance end 26 than at the exit end 28. The inner member 18 is suitably connected to the outer member 16 as, for example, by the threaded portions 30 and 32. By use of threaded portions 30 and 32, the alignment of inner member 18 in outer member 16 can be adjusted for a purpose which will become apparent. The inner member 18 is also threaded at 34 and mandrel support 22 is threaded at 36. Retaining ring 24 contains threaded portion 38 to cooperate with the threads 34 and 36 thereby holding mandrel support 22 in position. The mandrel support 22 has an inner portion 42 in annular relation with the outer portion thereof 44. Inner portion 42 of mandrel support 22 is supported by support portion 46. Inner portion 42 is suitably threaded at 48 to receive threaded portion 40 of mandrel 20.

Outer member 16 has a connection 50 for compressed air. Wall 52 of outer member 16 and wall 54 of inner member 18 are of such a relationship that, when assembled, annular space 56, as best seen in FIG. 1, is created. The purpose of annular chamber 56 will become apparent from the following description.

Returning now to FIG. 1, it will be seen that the elongated band of filtering material 12 enters the rearward end 26 of air nozzle 14 passing through the mandrel support 22 and generally being forced, in a random manner, around inner portion 42 of the mandrel support 22. The tow at this point is generally a hollow tubular element which continues around mandrel 20 to the forward end 28 of air nozzle 14. As the tow emerges from the forward end 28 of air nozzle 14, it is mixed with air supplied through fitting 50 and passing through chamber 56 to the exit, or forward, end 28 of air nozzle 14. Adjustment of inner member 18 in outer member 16 by means of threaded portions 30 and 32 creates a venturi-like opening at the exit end 28 of air nozzle 14, between forward end 19 of inner member 18 and forward end portion 21 of outer member 16. This opening could range in size from fully closed to about ¾ inch, but the practical limits of use, in order to obtain the desired venturi effect at customary air pressures, are from about 0.005 to about 0.050 inch. The tow emerging from the exit end 28 of air nozzle 14, mixed with air, "explodes" or blooms into a uniformly random fluffy mass 58 before passing into the first curing station 60. Mandrel 20 passes through air nozzle 14 and into the first curing station 60, extending through and slightly beyond first curing station 60. It should be noted at this point, that the upstanding portion 46 of mandrel support 22 does not affect the ultimate tubular shape imparted to the tow since the tow comprises a plurality of plasticized random filaments which separate when going around that obstruction but then come together and, in passing through the air nozzle 14, assume the proper cross-section.

The first curing station 60 is a heating and shaping apparatus, such as that disclosed in U.S. Pat. No. 3,095,343, issued on June 25, 1963 to Richard M. Berger. Since this apparatus is now known in the art, it need only be described herein in general terms, reference being had to the aforementioned U.S. Pat. No. 3,095,343 for details of its construction.

The heating and shaping apparatus making up the first curing station 60 is constructed in such a way that the moving tow which is being formed into a generally rod-like formation is contacted with steam as it passes through a die. The application of the steam to the filamentary tow as it is gathered together appears to result in softening of the tow fibers and the plasticizer carried thereon, and definitely has the effect of uniformly bonding the fibers of the tow together as they are gathered. By passing the steam onto the tow under pressure in a confined area at an angle to the longitudinal axis, and in a direction opposite the direction of movement of the tow, the steam is caused to pass through the tow, between the fibers and past the fibers as they are being gathered together. All of the filaments and all of the plasticizer are thus at least substantially uniformly heated, and bonding is at least substantially uniform throughout. Thus, the steam-treating apparatus of the aforementioned U.S. Pat. No. 3,095,343 produces a tubular, rod-like tow which proceeds to further treatment. Using the apparatus of the present invention, however, with the forward end of the mandrel 20 extending into and through the first curing station 60, the tow is converted to an axially elongated, hollow element 62.

The cured tow emerging from the first curing station is generally self-sustaining in shape and in cured condition. The term "cured," as used in the art, means a tow obtained from a process by which the fibers of the tow are bonded to adjacent fibers after the fibers have been gathered into a rod-like structure. The cured tow 62 then passes to a second curing station 64 wherein dry air is passed on to the tow and through the tow to set the fiber components and plasticizer components of the tow so that it has complete dimensional stability without excess stiffness or fiber fusion. Preferably, the air which is passed on to the tow at the second curing station 64 is perfectly dry, has a temperature of 90 degrees F. or below, and is maintained under a pressure of between 15 and 100 p.s.i.g. Moreover, for optimum results, the air should be passed on to the tow counter-current thereto and at an angle of substantially 45 degrees to the longitudinal axis of the tow, in much the same way as the steam contacts the tow in the first curing station 60. A suitable apparatus for air-treating the tow at the second curing station 64 is described in detail in the aforementioned U.S. Pat. No. 3,095,343. The air inlet to the second curing station 64 is indicated at 66, while the steam inlet to the first curing station 60 is indicated at 68.

After leaving the second curing station 64, the tow 62 passes to a pulling device generally designated by the numeral 70. The pulling device 70 can be any conventional device for applying motive power to the continuous filter rod 62 to move the same through the apparatus. As depicted in FIG. 1, the pulling device could be a conventional overwrap garniture with an endless belt 72 imparting a pulling movement to the tow 62. The belt 72 is driven by drive means schematically shown as 74.

Before continuing with the description of the method and apparatus of the present invention, it would be helpful to become familiar with the construction and advantages of the inventive filter means described and claimed in the aforementioned co-pending applications Ser. Nos. 727,477 and 820,355. To this end, attention is directed to FIGS. 6 through 9, wherein a portion of a filter cigarette is designated generally by the reference numeral 76 and comprises basically a tobacco portion 78 and a filter portion 80. The tobacco portion 78 comprises a rod of tobacco 82 overwrapped with paper, or the like, 84, as usual. The filter portion 80, in the embodiment shown in FIG. 6, comprises one form of filter element according to the invention of the aforementioned co-pending application Ser. Nos. 727,477 and 820,355 designated generally by the reference numeral 86 and secured in end-to-end relationsihp with one end of the tobacco portion 78 as by a tipping overwrap 88.

The filter element 86 includes basically an axially elongated, hollow, outer member 90 and an axially elongated, hollow, inner member 92 disposed within the outer member 90. In this embodiment, the outer member 90 is shown as a cylinder of ordinary "plug" wrap as is conventionally used in the manufacture of filter elements for cigarettes, although this member may be formed of plastic or other materials, if desired.

The inner member 92 is that element with which we are primarily concerned in the steps thus far described in the method and apparatus of the instant invention. That is what may be called a "tube" formed primarly of any one, or a combination of various, filtering media, as already described hereinabove. One end portion 94 is cylindrical providing peripheral portions of the outer surface of the inner member 92, limited in axial extent which are juxtaposed to portions of the inner surface of the outer member 90 to at least substantially preclude axial passage of smoke across the area therebetween. Any desired adhesive means (not shown) may be included in this area to provide a smoke-tight seal, although the outer member 90 may merely be overwrapped about the inner member 92 to provide a substantially smoke-tight seal in this area. The important characteristic of this area is that smoke will pass through portions of the filtering material of the inner member 92 as explained hereinafter before bypassing the inner member across this area.

It will be noted that the major portions of the outer surface of the inner member 92 are spaced from the inner surface of the outer member 90 to define first elongated, high surface area, cavity means 96 therebetween, this cavity means including the area surrounding the end of the inner member 92 spaced from the sealed area at 98 particularly if this end of the inner member is spaced inwardly (not shown) from the corresponding end of the outer member 90.

First integral portions 100 of the inner member 92 define a first area which extends across the interior of the inner member 92 and which offers at least as much resistance to passage of smoke as the filtering material from which the inner member 92 is primarily formed. These first portions 100, in the embodiment of FIG. 6, are defined by the end of the inner member 92 remote from the sealed area at 94 being crimped and preferably sealed in a manner to be described in more detail hereinafter. In this manner, the use of a separate baffle or closing element is avoided. Basically, these first portions 100 preclude preferred entry of the smoke from the tabacco portion 78 into the interior of the inner member 92 through this end of the inner member 92 and insure that the smoke will pass more uniformly through the filtering material of the inner member 92 from the first cavity means 96. As will be seen in FIG. 6, the first portions 100 in that embodiment are crimped to form a generally S- or Z-shaped cross-section, the laterally terminal edges 102 of which contact the inner surface of the outer member 90 to assist in centering the inner member 92 within the outer member 90 and in defining the first cavity means 96. In the preferred embodiment, only these laterally terminal edges 102 and the afore-mentioned peripheral portions 94 of the inner member 92 contact the outer member 90, the remainder of the outer surface of the inner member 92 being spaced from the inner surface of the outer member 90, thereby utilizing the maximum available surface area for filtration.

Alternative forms of crimping are shown in FIGS. 7, 8 and 9. The support given to the outer member 90 by the Y-shaped or cruciform ribs shown in FIGS. 7 and 8 is better than that given by the simple S or Z crimp shown in FIG. 6. In FIG. 9, a further alternative form of inner member 92 is shown. In this embodiment, the walls of member 92 are crimped so as to leave ribs which are arranged helically around the longitudinal axis of the member 92. By this means, good support is given to the outer member 90 and the cross-section of the latter may, when it is made of thin materials, be kept substantially circular.

Return to FIG. 6, second portions 98 of inner member 92 define a second area extending across the interior of the inner member 92 which offers less resistance to passage of smoke than the sealed area at 94. These second portions 98 may merely be the inner surface of the end portion of the inner member 92 remote from the first portions 100 and the second portions 98 define second elongated, high surface area, cavity means 104. Thus, it will be seen that smoke passing through the filter element between opposite ends thereof must travel through both the first cavity means 96 and the second cavity means 104 and must pass through the filtering material from which the inner member 92 is primarily formed. This construction provides an extremely high surface area for contact between the filtering material and the smoke, on the order of seven times or more than the surface area presented by the end portion of a conventional cellulose acetate filter. Yet, the construction of this filter, as will be readily recognized, provides substantially less pressure drop than a conventional cellulose acetate filter means of the same length. In this manner, extremely high filtration efficiency will be provided by the filter means without encountering any difficulty with respect to pressure drop.

Since the pressure drop of a filter means as hereinabove described is quite low, it is possible to secure a plug or disc 106 of cellulose acetate or any other desired material within the open end of the inner member 92, as shown in dotted lines in FIG. 6. This disc 196 then serves as the aforementioned "second portions" of the inner member 92 and may be included, if desired, to merely provide the filter element 86 with the appearance of a solid plug. Further, the disc 106 may be utilized to increase the pressure drop of the filter means 86 with particular "taste" characteristics or to enhance the physical characteristics of the filtering material from which the inner member 92 is primarily formed by filtering out certain constituents of the smoke which would otherwise pass through the filter means 86. Finally, the disc 106 serves to provide a second cavity means 104 having both ends closed whereby an additional smoke-modifying material 108 may be retained in the second cavity means 104. For example, this additional smoke-modifying material 108 may be a quantity of loose sorbent material in particulate form such as activated carbon, silica gel, or other adsorbents which enhances the vapor phase filtration efficiency of a filter means as hereinabove described. It should be understood that this disc 106 is not necessary to the filter and, in fact, is ordinarily not utilized since it necessitates handling an additional element. However, for special effects, it may be included, if desired. Furthermore, the cavity 104 may be closed by a plug 110 shown by dotted lines. Additionally, in the preferred embodiment shown in FIG. 7, an additional series of crimps or further integral peripheral portions 112 extending around a peripheral portion of the inner element 92 is provided. This insures the proper passage of the smoke through the filter.

Returning now to FIG. 1, when the tow, or tube 62 which will be used to make the inner portion 92 of the filter, leaves the pulling device 70, it passes into a third curing station 114 which is a steam jet quite similar to that used in first curing station 60. Basically, the construction of the steam jet in third curing station 114 is the same as that used in first curing station 60 with several minor modifications which will be apparent to one skilled in the art. Steam enters third curing station 114 through inlet 116 and passes through and around the tow 62 as it moves through the steam jet. Unlike the first curing station 60, however, the steam in third curing station 114 need not necessarily run counter-flow to the tow, but may actually pass co-currently with the same. In fact, in a preferred embodiment, the steam runs with the tow rather than counter to the same in third curing station 114. According to the concepts of the instant invention, this second steam treatment is an important preconditioning of the rod in order to prepare the same for the crimping operation to be performed in crimping station 118. The crimping could be performed without this preconditioning, but the amount of heat and pressure which would be necessary renders such a step less desirable. It has been found that when the tow is preconditioned in third curing station 114, the crimping can be done extremely easily. The crimping station 118, of course, will impart the desired configuration to the rod, as shown in FIGS. 6 through 9.

Figure 10:
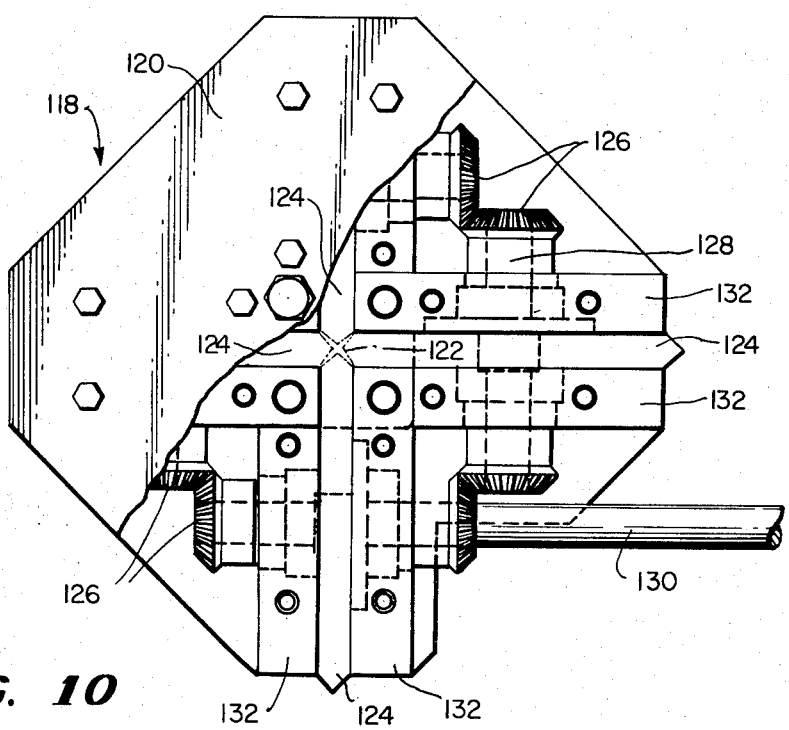
FIG. 10 is a partially broken away vertical elevational view of the crimping assembly utilized in the apparatus of the present invention and embodying the crimping wheel of FIG. 11.
Figure 5:
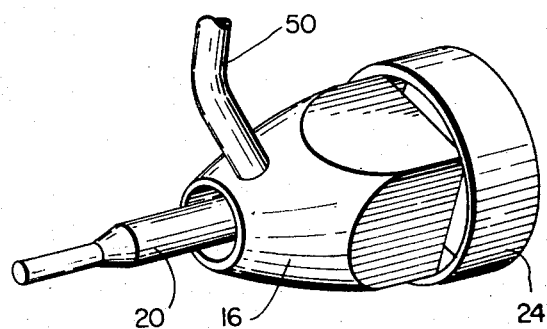
FIG. 5 is a perspective view of the air nozzle and mandrel assembly containing the elements depicted in FIGS. 2 through 4.

For a further understanding of crimping means 118, attention is directed to FIG. 10 wherein crimping means 118 is shown in more detail in elevational view, looking at the device from the rear, or inlet end. The housing 120 is partially broken away for ease of illustration. The preconditioned rod 62 coming from the third curing station 114 enters crimping means 118 at 122. In passing through crimping means 118, the rod is intermittently contacted by crimping wheels 124. Crimping wheels 124 are arranged in two pairs of opposed wheels. The crimping wheels 124, which will be described more fully hereinbelow, are driven by conventional means, such as bevel gears 126 which are interconnected by shafts 128 which, in turn, are powered by an external power source (not shown) through drive means 130. The crimping wheels 124 are mounted, through the shafts 128, in heater blocks 132 which also act as bearing supports. The heater blocks 132 carry a cartridge-type heater (not shown) and, accordingly, heat the crimping wheels 124.

As can be seen from FIGS. 11 through 13, crimping wheel 124 comprises a plurality of axially projecting first embossing portions 134 circumferentially spaced around the periphery of the wheel. A plurality of transverse grooves 136 are also arranged at spaced intervals around the periphery of the wheel 124, alternating with the first embossing portions 134. Second embossing portions 138 extend circumferentially around the periphery of the embossing wheel 124 between first embossing portions 134 and transverse grooves 136. Second embossing portions 138 include a pair of circumferential grooves, or valleys 139 and a plurality of raised portions, or lands, 141.

Keeping in mind the description of the filter means in FIGS. 6 and 7, and turning momentarily to FIGS. 14, 15 and 16, it will be seen that the tow 140 emerging from crimping means 118 comprises a continuous tube crimped at spaced intervals in such a manner that when cut apart, it will provide a plurality of inner members 92 of filter elements 86. First integral portions 100 of the inner members 92 are produced by the first embossing surfaces 134 of the crimping wheels 124. The additional series of crimps 112 are produced by second embossing surfaces 138. The peripheral unembossed areas 142 are the result of the transverse grooves 136. Since the rod 62 is a hollow tube, the crimped rod 140 retains the hollow configuration in those areas which have not been compressed by crimping means 118. This hollow configuration is shown in FIG. 16 wherein the cavity 144 appears.

Returning once again to FIG. 1, the crimped rod 140 emerging from crimping means 118 passes to fourth curing station 146. Fourth curing station 146 is an air jet similar to second curing station 64 having air supplied thereto through connection 148. This final curing stage sets the crimped rod 140 into its final shape. The rod 140 of crimped inner elements 92 is then overwrapped, for example, with a sheet of ordinary "plug" wrap, such as shown at 150, by-passing the crimped rod 140 and the plug wrap 150 through a means 152 which is a conventional overwrap garniture, with the assistance of an endless belt 156. The plug wrap 150 forms an axially elongated hollow outer element 90, the lateral edges of which may be secured together to form a longitudinal butt seam, or a longitudinal lapped seam, as is well known, sealing means 158 being shown for this purpose.

The continuous rod 160 of overwrapped combined inner and outer elements 90 and 92 may then be cut in any conventional manner, as by means schematically shown at 162, to provide a plurality of segments 164. For convenience in handling, each segment 164 may initially include four filter elements, the segments being first further subdivided, as shown by the dotted lines 168 in FIG. 14 to provide segments including two filter elements. The segments may then be associated with a pair of tobacco portions and overwrapped with a tipping paper before further subdividing the same to form two filtered cigarettes, each including a single filter element of the type shown, for example, in FIG. 6.

Figure 17:
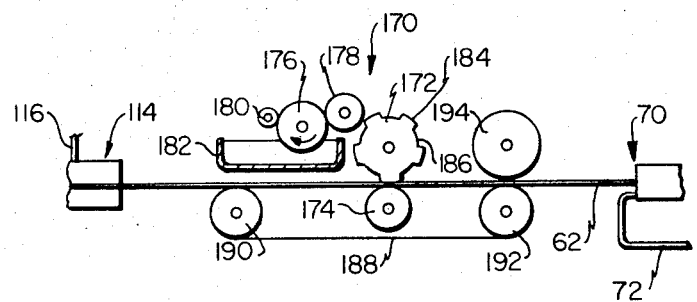
FIG. 17 is a fragmentary schematic view of another embodiment of the method and means of the present invention.
Figure 18:
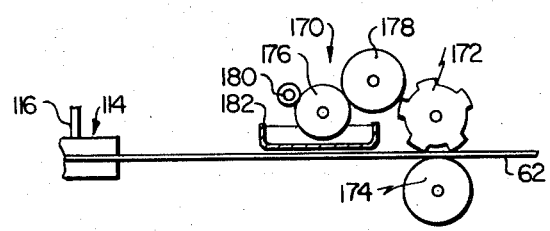
FIG. 18 is a fragmentary schematic view of still another embodiment of the method and means of the present invention.

The foregoing detailed description of the present invention is drawn to the preferred embodiment thereof. In an alternate form of that embodiment, there is provided a method and apparatus for making a filter of the type described, which filter further includes a section carrying an additional material capable of providing a required filtering or other effect upon tobacco smoke and unitary with a section without such a material. This additional material capable of having a filtering or other required effect upon tobacco smoke can be, prior to its application to the above-described filter means, in particulate, liquid or suspended state. Accordingly, method and means are provided in an alternate embodiment of the present invention for applying such additional material to the filter means. The additional material, as already explained, can be any material capable of providing a required filtering or other effect upon tobacco smoke, and is preferably finely divided activated charcoal. A method and means of applying such a material is disclosed and claimed in U.S. Pat. No. 3,371,000, which issued on Feb. 27, 1968. Reference is now had to FIGS. 17 and 18 wherein the additional steps and apparatus according to one variation of this embodiment are described. As the rod leaves the pulling device 70, and prior to entering third curing station 114, it passes through an applicator device 170. Applicator device 170 comprises an applicator roll 172, a pressure roll 174, a fountain roll 176, a further fountain roll 178, a doctor roll 180 and a trough 182. The trough 182 contains slurry to be applied to the paper. The fountain roll 176 dips into the slurry in the trough 180 at its lowest part and is in surface contact with the further fountain roll 178, which in turn is in surface contact with the applicator roller 172. The doctor roll 180 is so disposed as to doctor, or meter, the amount of slurry carried round by the roll 176 to be, ultimately, transferred to the applicator roller 172. The applicator roller 172 comprises a plurality of surfaces 184 separated from one another by axially directed valleys 186. The surfaces 184 conform to an imaginary cylinder coaxial with the roller 172. Each surface 184 may have an arcuate length equal to whatever length of "stripe" of the additional material it is desired to "print" onto the filter means. Additionally, the surfaces 184 may be separated from one another by any desired arcuate length. The pressure roll 174 serves to press the rod 62 into contact with the surfaces 184. The rod 62 passes into and through applicator device 170 on endless belt 188 which is entrained about two rollers 190 and 192. The rod 62 passes between the nip or roller 192 and roller 194 as it enters onto endless belt 188.

In FIG. 18, applicator device 170 also comprises applicator roll 172, pressure roll 174, fountain roll 176, further fountain roll 178, doctor roll 180 and trough 182. The endless belt and its accompanying drive rollers are not used in this embodiment, the rod 62 merely passing between applicator roller 172 and pressure roll 174. In both FIGS. 17 and 18, it can be seen that as the rod 62 leaves the applicator device 170, it passes into third curing station 114 where it is again cured with steam before entering crimping means 118. This curing additionally serves to "set" the stripe of activated carbon where it has been printed on the rod 62. It is additionally apparent that the length of the printed stripe of activated carbon is determined by the size of the filter, the unprinted areas being those areas wherein the plurality of filters will be cut apart.

In another variation of this embodiment, the slurry of additional material, such as activated carbon, or finely divided additional material, such as activated carbon alone or in combination with a suitable resin, such as those disclosed in U.S. Pat. No. 3,217,715, granted to Richard M. Berger on Nov. 16, 1965, or other additive, is applied to the hollow inner portion 144 (as shown in FIG. 16) of the tow 62 at the first curing station 60. This is done by providing a mandrel 20a which is hollow, as indicated by the broken lines 196. The hollow mandrel 20a is fed, at its rear or inlet end, with the additional material from a reservoir 198. The additional material is ejected from the hollow mandrel 20a at its forward end, in the neighborhood of first curing station 60, to deposit the additional material in the hollow tube 62. The additional material is injected in this manner by means of a pulsating feed to the mandrel. The mandrel 20a, in effect, serves as a pulsating nozzle. The pulsating feed from reservoir 198 to hollow mandrel 20a is accomplished by known means which need not be herein described.

Figure 19:
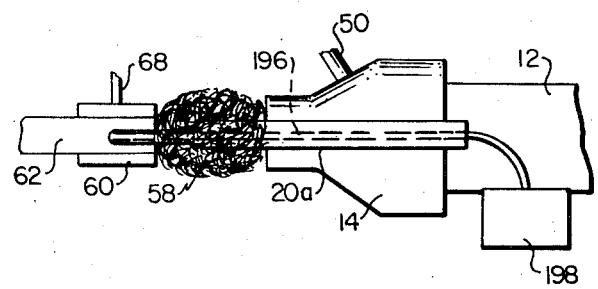
FIG. 19 is a fragmentary schematic view of yet another embodiment of the method and means of the present invention.

It will, at this point, be apparent to one skilled in the art that the various steps in the apparatus of the present invention must be carefully coordinated to insure a properly made and uniform product. For this reason, the driving means of pulling device 70, crimping device 118, and cutting device 162 are separately driven and synchronized using known synchronization means, or, preferably, driven by a single driving means through a drive train, including belts, and pulleys, and gears, so as to insure perfect synchronization of all moving parts, so that uniform manufacture will be achieved. Furthermore, in the embodiments of FIGS. 17 and 18, the drive means thereof are also synchronized with the other stations of the apparatus. By the same token, in the embodiment of FIG. 19, the pulsating feed of the additional material is so controlled and synchronized with the other stations of the inventive apparatus that deposit of the additional material is controlled in a proper manner.

Having now described the process and apparatus of the present invention and having set forth various advantages thereof, it should be apparent that the objects set forth at the outset of this specification have been successfully achieved. While this invention has been described with reference to presently preferred exemplary embodiments thereof, it should be clearly understood that the invention is not limited thereto but may be variously practiced within the scope of the following claims.

Accordingly, what is claimed is:

1. Apparatus for making a filter means comprising:
   (a) means for forming and bonding a continuous filamentary tow filtering material into an axially elongated, hollow, inner element;
   (b) means for crimping said inner element at axially spaced locations to form closed crimped portions extending across the interior of said inner element at said spaced locations with uncrimped portions therebetween;
   (c) means for overwrapping said inner element with an axially elongated hollow outer element, portions of the inner surface of which are juxtaposed to peripheral portions of said uncrimped portions of said inner element in a manner to substantially preclude axial passage of smoke across the area between said peripheral portions of said inner element and said portions of the inner surface of said outer element, the major portion of the outer surface of said inner element being spaced from the inner surface of said outer element; and
   (d) means for cutting said elements to provide segments having at least part of one crimped portion of said inner element and at least part of one uncrimped portion of said inner element.

2. The apparatus defined in claim 1, wherein said means for forming and bonding said filtering material into an axially elongated, hollow, inner element comprises a substantially frusto-conical air nozzle means and an elongated mandrel axially disposed in said air nozzle.

3. The apparatus defined in claim 2, wherein said forming and bonding means further includes a first curing station, said first curing station comprising steam jet means, said mandrel extending from said air nozzle means into said steam jet means.

4. The apparatus defined in claim 2, wherein said air nozzle means includes an inner portion and an outer portion, said inner portion being adjustably mounted within said outer portion to provide an annular space between said inner portion and said outer portion, and air inlet means to provide a flow of air to said annular space, said inner portion being adjusted in said outer portion such that venturi means are provided at the outlet end of said air nozzle means, whereby said filtering material exits said air nozzle means with said flow of air, air.

5. The apparatus defined in claim 4, wherein said air nozzle means further includes mounting means for said mandrel and retaining means.

6. The apparatus defined in claim 2, wherein said forming and bonding means further includes a second curing station, said second curing station comprising air jet means.

7. The apparatus defined in claim 1, wherein said crimping means comprises a plurality of heated crimping wheels and drive means for said wheels, said crimping wheels including a plurality of circumferentially spaced, axially projecting first embossing portions, a plurality of peripherally disposed circumferential second embossing portions, and a plurality of transverse grooves arranged at spaced intervals around the periphery of said wheel.

8. The apparatus defined in claim 7, further including steam jet means before said crimping means and air jet means immediately after said crimping means.

9. The apparatus defined in claim 1, further comprising means for providing a second filtering material to said axially elongated, hollow, inner element.

10. The apparatus defined in claim 9, wherein the last-mentioned means is an applicator means which comprises an applicator roller for printing a slurry of said second material on said inner element, supply means for said slurry, fountain roll means for transferring said slurry to said applicator roller means, and pressure roll means to support said inner element for application of said slurry thereto, said applicator means being located before said crimping means.

11. The apparatus defined in claim 9, wherein the last-mentioned means comprises a pulsating nozzle means for selectively injecting said second material into the hollow portion of said inner element.

12. Apparatus for making a filter means comprising:
   (a) means for forming filtering material into an axially elongated, hollow, inner element, said forming means comprising a substantially frusto-conical air nozzle means, axially elongated mandrel means axially disposed in said air nozzle means, first curing station means including steam jet means, said mandrel extending from said air nozzle means into said steam jet means, and second curing station means including air jet means;
   (b) third curing station means comprising steam jet means;
   (c) means for crimping said inner element at axially spaced locations to form closed crimped portions extending across the interior of said inner element at said spaced locations with uncrimped portions therebetween; said crimping means comprising a plurality of heated crimping wheels and drive means for said crimping wheels, said crimping wheels including a plurality of circumferentially spaced, axially projecting, first embossing portions, a plurality of peripherally disposed circumferential second embossing portions, and a plurality of transverse grooves arranged at spaced intervals around the periphery of said wheels;
   (d) fourth curing station means comprising air jet means;
   (e) means for overwrapping said inner element with an axially elongated hollow outer element, portions of the inner surface of which are juxtaposed to peripheral portions of said uncrimped portions of said inner element in a manner to substantially preclude axial passage of smoke across the area between said peripheral portions of said inner element and said portions of the inner surface of said outer element, the major portion of the outer surface of said inner element being spaced from the inner surface of said outer element; and
   (f) means for cutting said elements to provide segments having at least part of one crimped portion of said inner element and at least part of one uncrimped portion of said inner element.

References Cited
UNITED STATES PATENTS

| | | | |
|---|---|---|---|
| 3,637,447 | 1/1972 | Berger et al. | 156—180 |
| 3,095,343 | 6/1972 | Berger | 156—180 |
| 3,297,512 | 1/1967 | Cobb, Jr. et al. | 156—433 |

NORMAN G. TORCHIN, Primary Examiner

A. T. SURO PICO, Assistant Examiner

U.S. Cl. X.R.

156—180